(12) United States Patent
Kim

(10) Patent No.: US 6,935,990 B2
(45) Date of Patent: Aug. 30, 2005

(54) SAFETY DEVICE FOR POWER TAKEOFF FOR USE IN AUTOMOBILE AND METHOD FOR CONTROLLING THE SAME

(75) Inventor: Young-Heum Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 83 days.

(21) Appl. No.: 10/727,750

(22) Filed: Dec. 3, 2003

(65) Prior Publication Data

US 2004/0229727 A1 Nov. 18, 2004

(30) Foreign Application Priority Data

May 12, 2003 (KR) ................. 10-2003-0029789

(51) Int. Cl.[7] ............. B60K 41/02; B60K 17/28
(52) U.S. Cl. ..................... 477/175; 180/53.1
(58) Field of Search ................. 477/175, 180, 477/70; 180/271, 53.1

(56) References Cited

U.S. PATENT DOCUMENTS

| | | |
|---|---|---|
| 4,372,265 A | 2/1983 | Kasiewicz |
| 5,237,883 A | 8/1993 | Churchill et al. |
| 5,562,173 A | 10/1996 | Olson |
| 5,611,751 A | 3/1997 | Ehrenhardt et al. |
| 5,971,888 A | 10/1999 | Goode |
| 6,080,081 A * | 6/2000 | Sauermann et al. ....... 180/53.1 |
| 6,173,225 B1 * | 1/2001 | Stelzle et al. ............. 180/53.6 |
| 6,267,189 B1 | 7/2001 | Nielsen et al. |
| 6,517,465 B2 * | 2/2003 | Hrazdera .................. 477/174 |

* cited by examiner

*Primary Examiner*—Roger Pang
(74) *Attorney, Agent, or Firm*—Morgan Lewis & Bockius LLP

(57) ABSTRACT

A safety circuit for power takeoff (PTO) for use in an automobile and a method for controlling the same is disclosed. The safety circuit determines whether a PTO unit, driving a pump, and a transmission must be coupled to each other according to the speed of the automobile and operating states of a clutch switch and PTO switch manipulated by a driver without use of an additional power cutoff relay. Such a safety circuit provides a cost-effective system capable of reducing the number of system components and quickly performing a stable operation using a small number of components in comparison with a system equipped with a conventional safety device for PTO.

5 Claims, 3 Drawing Sheets

SAFETY DEVICE FOR POWER TAKEOFF FOR USE IN AUTOMOBILE AND METHOD FOR CONTROLLING THE SAME

CROSS-REFERENCE TO RELATED APPLICATIONS

This application claims priority of Korean Application No. 10-2003-0029789, filed on May 12, 2003, the disclosure of which is incorporated fully herein by reference.

FIELD OF THE INVENTION

The present invention relates to a power takeoff (PTO) unit for use in an automobile and, more particularly, to a safety circuit for power takeoff (PTO) for disabling an option of a PTO unit when the automobile is driven at a high speed

BACKGROUND OF THE INVENTION

Conventionally, a power takeoff (PTO) unit for use in an automobile drives other devices or units to perform desired operations with power obtained from an engine of the automobile.

SUMMARY OF THE INVENTION

Embodiments of the present invention provide a safety device for a power takeoff (PTO) unit for use in an automobile and a method for controlling the same. Preferably, a body control module (BCM) determines whether a PTO unit and a transmission must be coupled to each other according to the speed of the automobile and operating states of a clutch switch and a PTO switch without use of an additional power cutoff relay, such that a stable PTO control signal is outputted In accordance with a preferred embodiment of the present invention, a safety device for a power takeoff (PTO) for use in an automobile comprises a detection unit for detecting operating states of a power supply, clutch switch, PTO switch, and vehicle speed varying with the operating state of the automobile and operating state of a switch manipulated by a driver. A body control module (BCM) receives a power supply signal, a clutch switch signal, a PO switch signal and a vehicle speed signal detected from the detection unit. The BCM outputs a control signal for enabling an operation of a PTO when the PTO switch is turned on in a state where the clutch switch is turned on, and outputs a control signal for disabling an operation of the PTO unit when the vehicle speed is higher than predetermined reference vehicle speed, The PTO switch is turned off in a state where the clutch switch is turned on, or the engine stops running. A solenoid valve is in an "ON/OFF" state according to a control signal outputted from the BCM and controls an operation for supplying and cutting off a negative pressure so that the PTO unit can be driven and stopped.

In accordance with another embodiment of the present invention, a method for controlling a power takeoff (PTO) unit operation in an automobile comprises (a) determining whether the automobile's engine has started; (b) if the automobile's engine has started as a result off the determination in step (a), determining operating states of the clutch switch and PTO switch manipulated by a driver, (c) if the clutch switch and PTO switch have been turned on by the driver as a result of the determination in step (b), outputting a control signal for controlling a PTO unit to be in an "ON" state; (d) if the PTO unit is in the "ON" state as a result of the determination in step (c), determining the speed of the automobile; and (e) if the speed satisfies a condition in which the PTO unit can be in an "OFF" state outputting a control signal for controlling the PTO unit to be in the "OFF" state.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

The preferred embodiments of the present invention will now be described in detail with reference to the annexed drawings.

Figure 1:
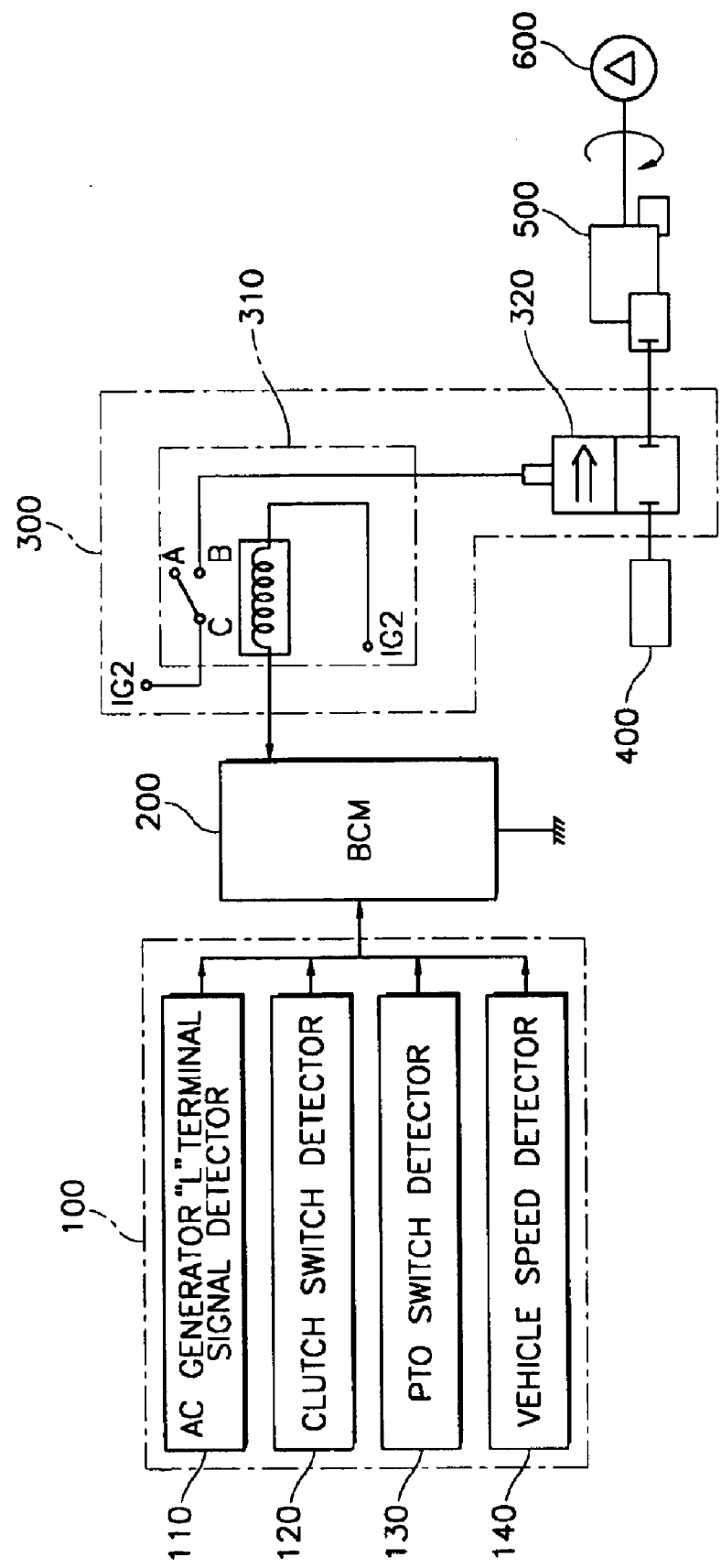
FIG. 1 is a schematic diagram illustrating a safety device for power takeoff (PTO) for use in an automobile in accordance with an embodiment of the present invention.

A safety device for power takeoff (PTO) for use in an automobile in accordance with an embodiment of the present invention, as shown in FIG. 1, includes a detection unit 100, a body control module (BCM) 200 and a drive unit 300. BCM 200 preferably comprises a processor and associated hardware and software that may be selected and programmed by a person of ordinary skill in the art based on the teachings herein for control of driver convenience devices such as a head lamp, fog lamp, room lamp, wiper, crash door unlock system, central door lock/unlock, keyless entry, antitheft, seat belt warning, battery saver, power window system or the like.

The detection unit 100 includes an "L" terminal signal detector 110 for detecting a "LOW" or "HIGH" signal outputted from an "L" terminal of an alternating current (AC) generator; a clutch switch state detector 120 for detecting the operating state of a clutch switch turned on/off according to an operating state of a clutch pedal manipulated by the driver; a PTO switch state detector 130 for detecting the operating state of a PTO switch manipulated by the driver, and a speed detector 140 for detecting the speed of the automobile.

The BCM 200 receives the AC generator's "L" terminal signal, signals indicating the operating states of the clutch switch, PTO switch, and vehicle speed signals, and then determines that the engine has started if the AC generator's "L" terminal signal is switched from a "LOW" signal to a "HIGH" signal. When the PTO switch is turned on in a state where the clutch switch is turned on, the BCM 200 outputs a control signal for driving PTO unit 500. Then, the BCM 200 turns off the PTO switch when the speed of the vehicle is higher than a predetermined reference speed when the clutch switch is turned on, or the engine stops running The drive unit 300 includes a PTO relay 310; and a solenoid valve 320 for supplying or cutting off a negative pressure from negative pressure tank 400 to the PTO unit 500 to control coupling or decoupling between the PTO unit 500 and transmission (not shown) according to the operating state of the PTO relay 310.

As shown in FIG. 1, a "C" terminal of the PTO relay 310 is connected to an ignition switch IG2, a "B" terminal of the PTO relay 310 is connected to the solenoid valve 320, and an "A" terminal of the PTO relay 310 is not connected to the "B" terminal. Furthermore, one side of an exciting coil provided in the PTO relay 310 is connected to the BCM 200, and the other side of the exciting coil is connected to the ignition switch IG2. In response to a control signal from the BCM 200, the exciting coil is excited.

Figure 3:
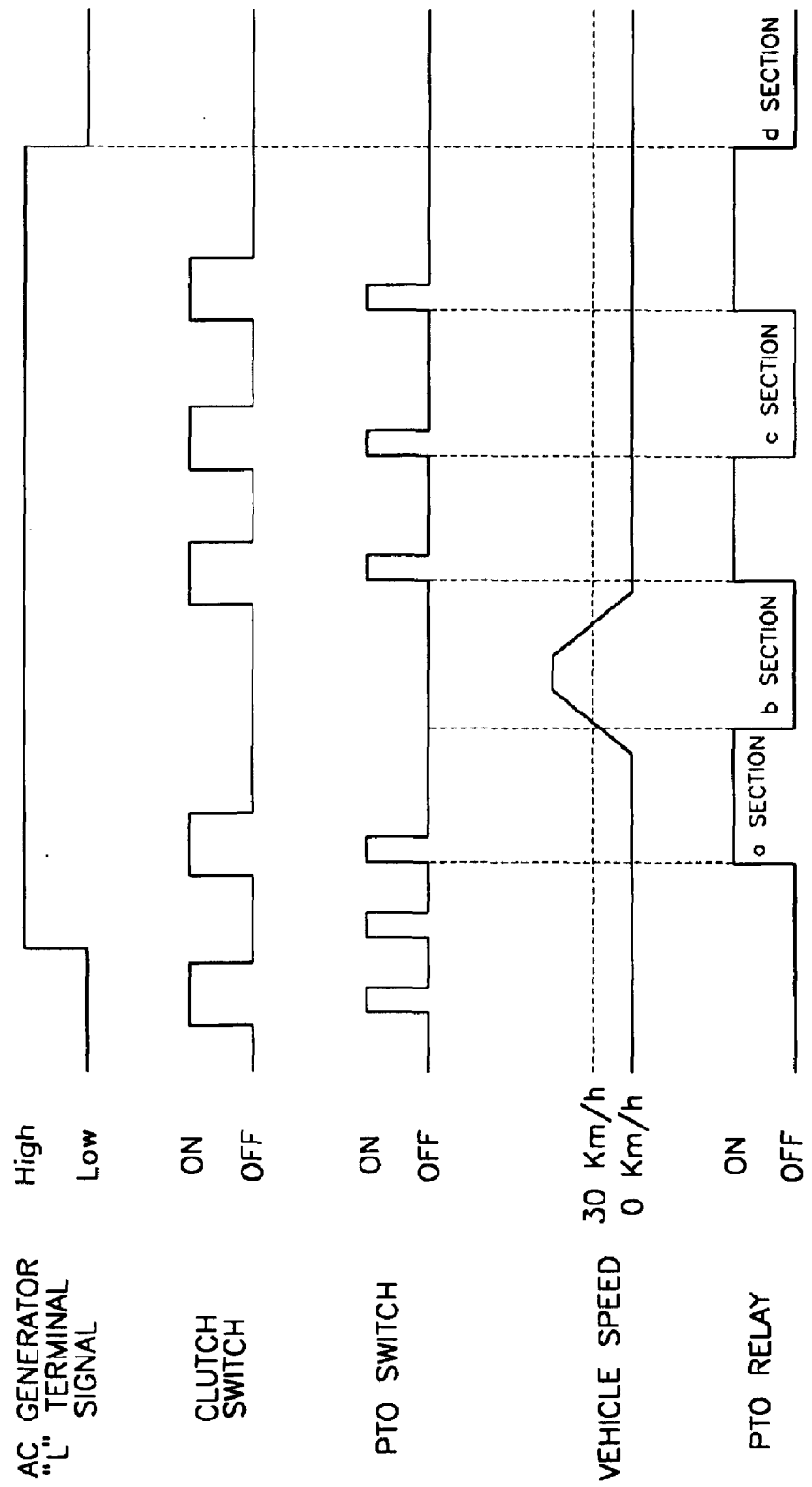
FIG. 3 is a timing chart illustrating signals and states detected by the safety device for PTO in an embodiment of the present invention.

FIG. 3 is timing chart illustrating signals and states detected by the safety device for PTO in an embodiment of the present invention. As shown in FIG. 3, an "a" section indicates that the PTO relay 310 is in an "ON" state only when the PTO switch is turned on in a state where the clutch switch is turned on by the driver. The "b" section indicates that the PTO relay 310 is in an "OFF" state when the automobile is driven at a predetermined speed or above so that the coupling operation between the PTO unit 500 and the transmission (not shown) is released. The "c" section indicates that the PTO relay 310 is switched from the "ON" state to the "OFF" state as the clutch switch and the PTO switch are re-manipulated by the driver. The "d" section indicates that the PTO relay 310 is switched from the "ON" state to the "OFF" state when the automobile's engine stops running.

As an example, a method for controlling the safety device for PTO for use in the automobile will now be described with reference to FIGS. 2 and 3.

The "ON" and "OFF" states of the PTO unit 500 are the same as those of the PTO relay 310.

If the driver riding in the automobile equipped with the PTO unit 500 manipulates the key to start the automobile, the BCM 200 determines, at step S100, whether the automobile's engine has started on the basis of a signal outputted from or detected by the "L" terminal signal detector 110 provided in the detection unit 100. The "L" terminal signal detector 110 detects a "LOW" signal from the "L" terminal of the AC generator when the automobile's engine is in an "OFF" state, and then detects a "HIGH" signal from the "L" terminal of the AC generator when the automobile's engine has been started. Thus, the BCM 200 determines that the automobile's engine has been started when a signal outputted from the "L" terminal signal detector 110 is switched from the "LOW" signal to the "HIGH" signal.

When determining that the automobile's engine has been started, the BCM 200 determines, at step S110, whether the clutch switch is turned on according to operation of the clutch pedal manipulated by the driver. When determining that the clutch switch has been turned on, the BCM 200 also determines the operating state of the PTO switch for driving the PTO unit 500 at step S120. If it is determined that the PTO switch is turned on in a state where the clutch switch is turned on, the BCM 200 determines that the drive desires to couple the PTO unit 500 to the transmission (not shown) and outputs a control signal for driving the PTO unit 500 at step S130.

Figure 2:
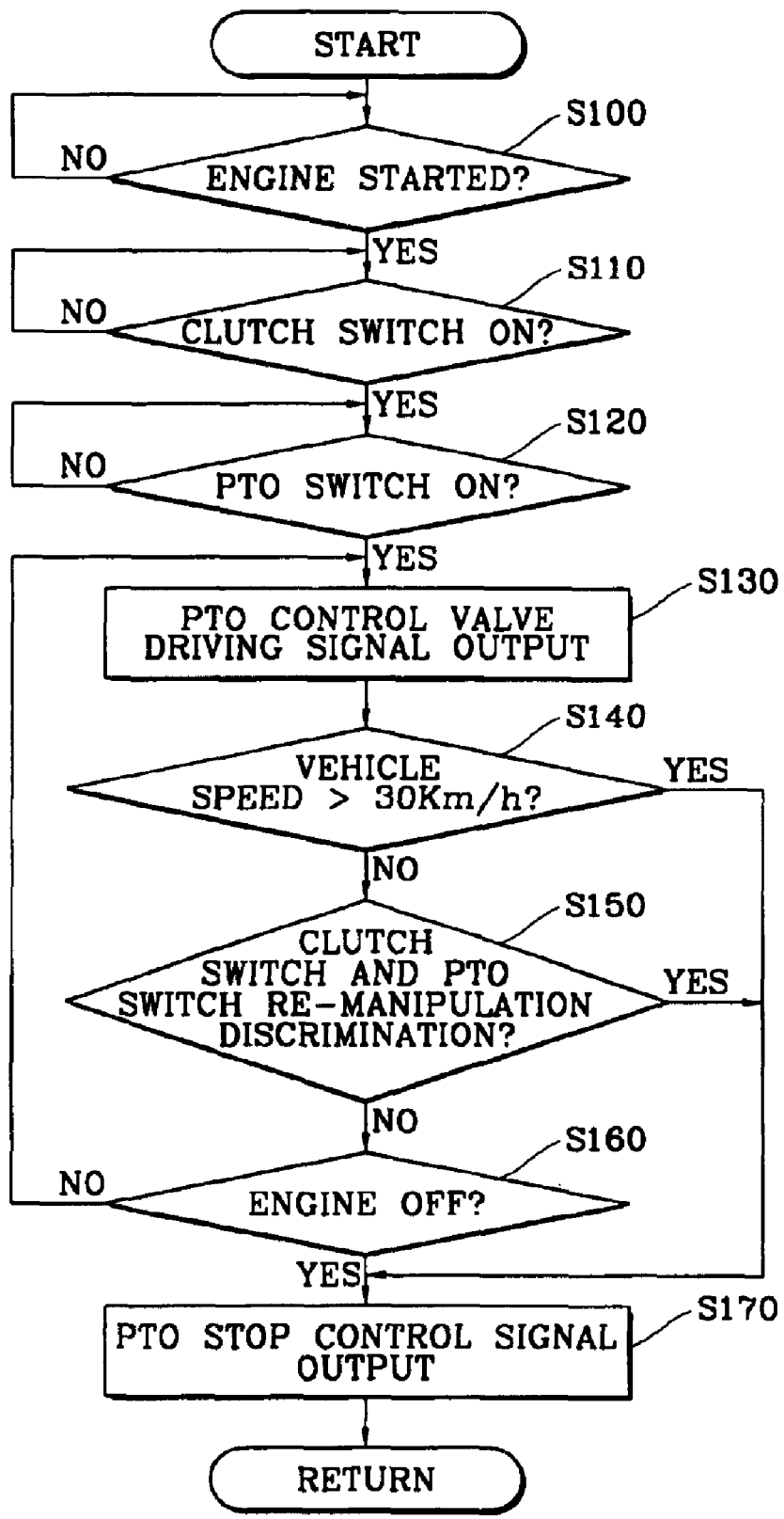
FIG. 2 is a flowchart illustrating a method for controlling the safety device for PTO for use in an automobile in accordance with an embodiment of the present invention.

In the "a" section in the timing chart shown in FIG. 3, the exciting coil of the PTO relay 310 provided in the drive unit 300 is excited by power supply voltage applied from the ignition switch IG2 in response to a control signal from the BCM 200 shown in FIG. 2, and the "C" terminal of the PTO relay 310 is connected to the "B" terminal of the PTO relay 310. Thus, the power supply voltage is applied to the solenoid valve 320. The solenoid valve 320 is switched from a non-conductive state to a conductive state so that the negative pressure of the negative pressure tank 400 can be transferred to the PTO unit 500.

The PTO unit 500 is coupled to the transmission (not shown) in response to the negative pressure of the negative pressure tank 400 transferred through the solenoid valve 320 and then drives a pump 600. Then, the BCM 200 receives a vehicle sped signal applied from the vehicle speed detector 140 and determines whether or not the vehicle speed signal is a signal indicating more than a predetermined reference vehicle speed (e.g., 30 Km/h) for releasing the coupling operation between the PTO unit 500 and the transmission (not shown) at step S140.

If it is determined that the vehicle speed signal indicates more than the predetermined reference vehicle speed, the BCM 200 outputs a control signal for controlling an "OFF" state of the PTO relay 310 to cut off the power supply voltage outputted to the exciting coil of the PTO relay 310 as in the "b" section shown in FIG. 4 at step S170. As the PTO relay 310 is in the "OFF" state in response to the control signal, the power supply voltage applied to the solenoid valve 320 is cut off, and the solenoid valve 320 is switched from the conductive state to the non-conductive state, such that the negative pressure to be transferred from the negative pressure tank 400 to the PTO unit 500 is cut off. For this reason, the coupling state between the PTO unit 500 and the transmission (not shown) is released and hence the operation of the pump 600 is stopped.

On the other hand, if the vehicle speed is equal to or lower than the predetermined vehicle speed (e.g., 30 Km/h) as a result of the determined in the above step S140, the BCM 200 determines, at step S150, whether the driver re-manipulates the clutch switch and the PTO switch after the "b" section of FIG. 3.

If it is determined that the PTO switch is tuned on in a state where the driver turns on the clutch switch, the BCM 200 outputs a control signal for controlling the PTO relay 310 provided in the drive unit 300 to be in an "ON" state so that the PTO unit 550 and the transmission (not shown) are coupled to each other and then the pump 600 is driven.

On the other hand, if it is determined that the driver re-manipulates the clutch switch and PTO switch as in the "c" section of FIG. 3 in a state where the PTO relay 310 is turned on, the BCM 200 outputs a control signal for controlling the PTO relay 310 to be in the "OFF" state so that the coupling state between the PTO unit 500 and the transmission (not shown) can be released, in the above step S170.

When the driver manipulates the clutch switch and PTO switch in a state where the automobile is stopped, the BCM 200 outputs a control signal for controlling the PTO relay 310 to be in the "ON" state so that the pump 600 can be driven.

If the driver steps the automobile engine in step S160, the BCM 200 determines a signal applied from the 'L' terminal signal detector 110 coupled to the "l" terminal of the AC generator. When determining that the 'L' terminal signal of the AC generator is switched from the "HIGH" signal to the "LOW" signal according to a result of the determination, the BCM 200 outputs a control signal for controlling the PTO relay 310 to be in the "OFF" state so that the operation of the pump 600 can be stopped as in the "d" section shown in FIG. 3, in the above step S170.

Consequently, the present invention can allow the BCM to determine whether a power takeoff (PTO) unit and a transmission must be coupled to each other according to the speed of an automobile, operating states of the clutch switch and PTO switch manipulated by a driver without use of an additional power cut off relay so that a control signal for controlling a negative pressure supply or cutoff operation is outputted. Therefore, the present invention can provide a system capable of quickly performing a stable operation using a small number of components in consign with a system equipped with a conventional safety device for PTO.

As apparent from the above description, the present invention provides a safety circuit for PTO for use in an automobile and a method for controlling the same, which can allow a body control module (BCM) to determine whether a power takeoff (PTO) unit and a tension must be coupled to each other according to the speed of the automobile and operating states of clutch switch and PTO switch manipulated by a driver without use of an additional power cutoff relay, thereby implementing a cost-effective system capable of reducing the number of system components and quickly performing a stable operation using a small number of components in comparison with a system equipped with a conventional safety device for PTO.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A safety device for power takeoff (PTO) for use in an automobile, comprising:

a detection unit for detecting operating states of a power supply, clutch switch, PTO switch, and vehicle speed varying with the operating states of the automobile and switch manipulated by a driver;

a body control module (BCM) for receiving a power supply signal, a clutch switch signal, a PTO switch signal, and a vehicle speed signal detected from the detection unit, outputting a control signal for enabling an operation of a PTO when said PTO switch is turned on in a state where said clutch switch is turned on, and outputting a control signal for disabling an operation of a PTO unit when the vehicle speed is higher than predetermined reference vehicle speed, said PTO switch is turned off in a state where the engine stops running; and a solenoid valve being in an "ON"/"OFF" state according to a control signal outputted from said BCM, said solenoid valve controlling supply of negative pressure so that said PTO unit can be driven and stopped.

2. A method for controlling a power takeoff (PTO) operation in an automobile, comprising:

(a) determining whether an automobile engine has been started;

(b) if the automobile engine has been started as a result of the determination in step (a), determining operating states of a clutch switch and a PTO switch manipulated by a driver;

(c) if said clutch switch and PTO switch have been turned on by the driver as a result of the determination in step (b), outputting a control signal for controlling a PTO unit to be in an "ON" state;

(d) if said PTO unit is in the "ON" state as a result of the determination in step (c), determining the speed of the automobile; and (e) if the vehicle speed satisfies a condition in which said PTO unit can be in an "OFF" state, outputting a control signal for controlling said PTO unit to be in the "OFF" state.

3. The method as set forth in claim 2, further comprising:

(f) if the speed of the automobile cannot satisfy the condition in which said PTO unit can be in the "OFF" state, outputting a control signal for controlling said PTO unit to be in an "ON" state when driver's re-manipulation for said clutch switch and PTO switch is detected.

4. The method as set forth in claim 2, further comprising:

(g) when driver re-manipulation of said clutch switch and PTO switch is performed in a state where said PTO unit is in the "ON" state, outputting a control signal for controlling said PTO unit to be in the "OFF" state.

5. The method as set forth in claim 2, further comprising:

(h) when the engine stops running, outputting a control signal for controlling said PTO unit to be in the "OFF" state.

* * * * *